Figure 1:
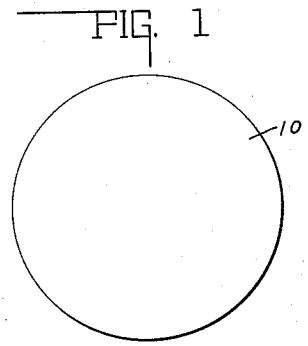

Aug. 17, 1926.

L. W. BUGBEE, JR 1,596,396

PROCESS OF MAKING FUSED MULTIFOCAL LENSES

Filed Dec. 14, 1925

INVENTOR.
LUCIAN W. BUGBEE, JR.

BY
*Lockwood & Lockwood*

ATTORNEYS.

Patented Aug. 17, 1926.

1,596,396

UNITED STATES PATENT OFFICE.

LUCIAN W. BUGBEE, JR., OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

PROCESS OF MAKING FUSED MULTIFOCAL LENSES.

Application filed December 14, 1925. Serial No. 75,356.

The glasses or glass elements which are employed in making an achromatic fused bifocal or multifocal lens ordinarily having melting or softening points which make them unsuitable for fusing in the ordinary manner employed with the similar types of non-achromatic fused bifocal lenses. The button or minor lens made of barium crown usually employed often melts at a higher temperature than the major element or portion of the lens made of crown glass or extra light flint glass. Hence, the minor element of the lens or button sags during the fusing process so as to unite with the countersunk surface of the major element and the latter has softened and, therefore, distorted the curvature and this detracts from the optical quality of the image. In the ordinary method of making fused bifocal lenses, countersink in the major element is given the final permanent curvatures of the fused surfaces of the finished lens, and the button or minor element is given a stronger curvature than the desired final curvature and the button is placed upon the major element in the countersink, so that as the button sags under the heat, it shall drive out the air before its surface unites with the countersink surface, which latter has been given the permanently desired curvature.

In this present invention, however, the button or minor element is given the curvature which is desired to be the permanent curvature that the united surfaces shall finally possess. The major element is superimposed on the button or minor element and since the former is made of glass of a lower heat-softening temperature than the latter or minor element, the major or superimposed element collapses and unites with the surface of the minor element.

By this novel method, the adjacent countersink and button curved surfaces are protected from particles of flying dust, dirt and the like which would be the cause of bubbles and imperfections between the fused surfaces. This result arises from the fact that the major element, during the fusing process wholly covers over, envelops and protects the surfaces to be fused. Hence, the porcelain cup or other protecting cover, which has been required and often used in making fused bifocal lenses heretofore for the above purpose, are eliminated. Also the air is expelled by the sagging of the major element and bubbles between the elements avoided, in the finished lens. In addition, by this novel method, there is much less likelihood of the button being jarred from its position during the fusing process, which is a serious sort of danger in the ordinary practice. This danger is eliminated because the button in this new process is held in place by the weight or pressure of the major element superimposed on the button.

The full nature of the invention will be understood from the accompanying drawings and the following description and claims.

Figure 2:
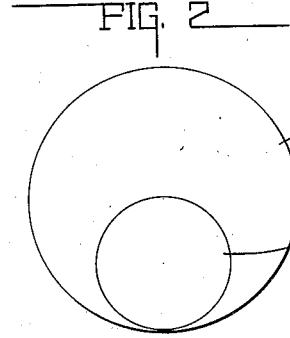
Figure 3:
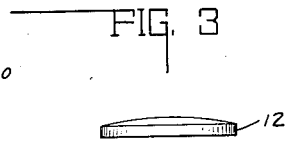
Figure 4:
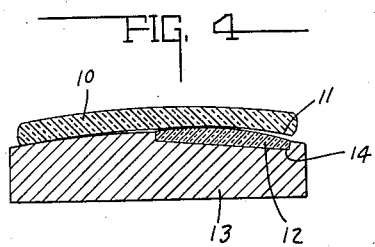
Figure 5:
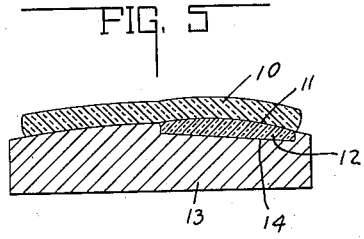
Figure 6:
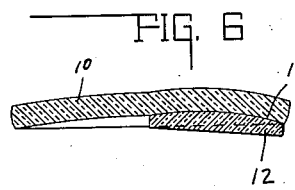
Figure 7:
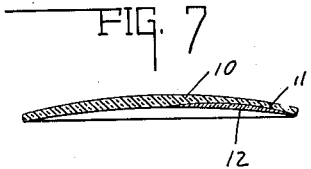
Figure 8:
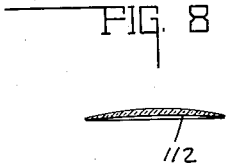
Figure 9:
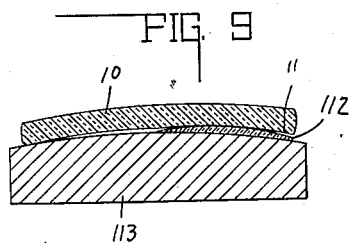
Figure 10:
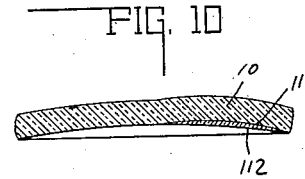
Figure 11:
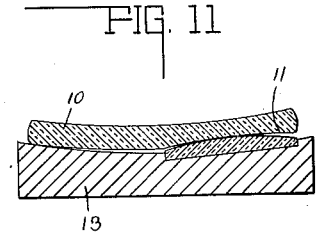

In the drawings, Fig. 1 is a plan view of a plain piece of glass to form the major element or portion 10 of the lens. Fig. 2 is the same major element provided with a circular countersink. Fig. 3 is a side elevation of the button or minor element. Fig. 4 is a central vertical section through a fusing block and the major and minor elements of the lens previously to the fusion thereof. Fig. 5 is a similar section showing the elements of the lens blank fused. Fig. 6 is the same as the upper part of Fig. 5, being the lens blank removed from the block. Fig. 7 is a similar section of the finished lens. Fig. 8 is a similar section through a thinner or modified form of the minor element for use on a block without a countersunk seat therefor. Fig. 9 is a view similar to Fig. 4 of a modified form. Fig. 10 is a section similar to Fig. 7 of a modified form. Fig. 11 is a central vertical section through a modified form of blocks and glass elements, in a position shown in Fig. 4.

A molded rough blank 10 of glass is employed and as herein shown it is concavo-convex and is used for making the major element of the lens and is formed with crown glass. It is provided on its concave surface with a countersink or recess 11 as has been customary in this art, excepting that the curvature of the recess 11 is not exactly the same as the ultimate curvature thereof in the finished lens but as shown in Fig. 4 is slightly less than such ultimate curvature.

The button or minor segment 12 is circular and adapted to fit in the recess 11 of the major element for fusing. This button has its upper surface finished permanently and has a curvature before fusion the same as after fusion and agrees exactly with the ultimate curvature of such surface of the finished lens. The button shown in Fig. 3 is relatively thick.

After the button is completed, as shown in Fig. 3, it is mounted on the block 13 having its upper surface curved approximately the same as the curvature of the concave surface of the major element 10 and in said surface there is a recess 14 formed to receive the button 12 so that the curved surface of such button shall extend only slightly above the block and in substantially its final position in relation to the ultimate lens formed after fusion. The major element 10 is then laid upon the block 13 with the recess 11 thereof lying upon the button 12, as shown in Fig. 4. As there appears, the major element entirely covers the button and protects its surface as a cover from dust or any foreign particles. Also since the curvature and the recess 11 in the major element 10 is slightly less than the curvature of the button, there is little space between the marginal portions of the button and the major element 10.

The next step is carried out by placing the parts as illustrated in Fig. 4, in a suitable fusing formation as is well known in the art, and heating the same with sufficient temperature to cause the desired fusion with the result as shown in Fig. 5. Fig. 5 shows parts of the lens after fusion and it is observed that the button and its convex surface after fusion are exactly the same as before fusion. But there has been a change due to the heat in the major element 10. This is due to the fact that the glass constituting the major element 10 is of a lower heat softening temperature than the glass which constitutes the button and when the proper temperature is employed, the button does not melt but the major element 10 does soften and by gravity or other force sag down from the original position as shown in Fig. 4 to the fused condition as shown in Fig. 5. That causes the major element 10 to come in close contact throughout the recess surface 11 with a curvature of the button at all points and as the major element 10 settles in the fusing process, it necessarily crowds out the air between it and the button. This is caused when the two elements are brought together as shown in Fig. 4, that touch practically at one point and as the major element settles, its surface comes in contact with the button first near original contact point and the contacting of the two surfaces proceeds gradually from said original contact point outward and thus expells the air so as to avoid bubbles or like difficulties. The countersink 14 in the block 13 in the manner shown in Fig. 4 is desirable because the block 13 holds the button well in place and that makes the operation very easy, and aside from properly locating the major element 10 on the block and button as shown in Fig. 4 nothing is left to be done except the application of the desired heat. The heat and gravity or other downwardly applied force form the remainder of the operation.

The ultimate blank resulting from such fusion is shown in Fig. 6 and afterwards the blank is finished to make the finished fused bifocal lens shown in Fig. 7.

In this process the major element is permitted to support itself on the button and block without any aid and there is no difficulty in bringing the two elements into relatively proper position as the button is held by the block and the major element is large enough to ease the handle and locate it, and will be retained in proper position by gravity. Thus a slight jar would not affect the operation to any extent, although in the old process of fusing bifocal lenses, a slight jar may throw the delicately balanced button out of position so as not to fuse in the center of the countersink or dislodge the wedge, etc. Also the use of the porcelain cup for protecting the elements while being brought together and fused, according to the old process, is rendered unnecessary here because the major element performs the work of the porcelain cup as one of its functions.

The modified process is illustrated in Figs. 8 and 9 and 10. There, as shown in Fig. 9, no recess 14 is provided in the block 113 and the button 112 is made relatively thinner than as in Fig. 3 but its upper surface is the same and is the final curvature of such surface. In this modified process said thin button is placed upon the plain surface of the block 113 and since it does not project upwardly very far, the major element 10 is placed on said button and block, as shown in Fig. 9, and fused, the fused blank being shown in Fig. 10. Little grinding of the concave surface of this blank is required and a plain block may be used and the same advantages arise here as in the method illustrated in Fig. 4, as the major element 10 entirely covers the button and protects it and the air is automatically expelled from between the blanks as the major element settles during the fusing.

While the process for fusing a concave major element with a minor element, has been shown and described, the invention is equally applicable when said major element is convex, as shown in Fig. 11. In such instance, the countersink 11 is made on the convex side of the major element 10, and the top of the block 13 is concave instead of convex, substantially as shown. The process and advantages thereof are substantially the same as in the other form.

The foregoing method is, therefore, of great value in the manufacture of fused lenses wherein the minor element is made of a quality of glass that requires a higher temperature to soften it than is required to soften the glass which constitutes the major element. By such process fused bifocal lenses can be very rapidly manufactured and be relatively free from dust and bubbles between the fused surfaces, and the margin of the minor element or button will remain perfect, clear and distinct and not become irregular or prismatic so that in the finished lens there will be an accurate blending between the margin of the button and the major element and thus produce a very fine quality of lens of the kind.

The invention claimed is:

1. In the process of making fused multifocal lenses, wherein there is a major element with a countersink and a minor element to be fused therein, superimposing the major element upon and covering the minor element and then fusing them, whereby the major element will during the fusing sag down and bring the surface of the countersink into fusing relation with the surface of the minor element.

2. In the process of making fused multifocal lenses, as set forth in claim 1, making the surface of the minor element that is to be used of the exact curvature to be desired finally in the fused lens so that the ultimate curvature of the fused surfaces will be predetermined by the curvature of the minor element.

3. In the process of making fused multifocal lenses, as set forth in claim 1, making the countersink in the major element of less curvature than the surface of the minor element and placing the major element on the minor element so that it will contact with the surface of the minor element at one point before fusion and the contacting between said surfaces will progress gradually outwardly from said point to the margin of the minor element during fusion, whereby the air will be automatically expelled from between the two elements as the fusion proceeds.

4. In the process of making fused multifocal lenses, making a minor element of glass requiring a relatively high temperature to soften it and giving to it the curvature ultimately desired for the curvature of the fused surfaces of the lens when finished, making a major element of glass which will soften at a lower temperature than said minor element and providing therein a countersink for the minor element, placing the minor element on a block having a curvature approximately that of the finished curvature of the major element and with the curvature of the minor element extending upward, superimposing the major element on said block and minor element with the countersink resting on the minor element, and thereafter subjecting the same to a temperature which will soften the major element and cause it to sag down and fuse with the minor element.

5. The process of making fused multifocal lenses substantially as set forth in claim 4, providing a recess in the surface of the block for receiving and seating the minor element during the assemblage of the parts and the fusing operation.

In witness whereof, I have hereunto affixed my signature.

LUCIAN W. BUGBEE, Jr.